(12) United States Patent
Nakamura et al.

(10) Patent No.: US 10,840,791 B2
(45) Date of Patent: Nov. 17, 2020

(54) LINEAR MOTOR

(71) Applicant: MITSUBISHI ELECTRIC CORPORATION, Chiyoda-ku (JP)

(72) Inventors: Yuichiro Nakamura, Chiyoda-ku (JP); Shinichi Yamaguchi, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 554 days.

(21) Appl. No.: 15/549,840

(22) PCT Filed: Mar. 16, 2016

(86) PCT No.: PCT/JP2016/058381
§ 371 (c)(1),
(2) Date: Aug. 9, 2017

(87) PCT Pub. No.: WO2016/170876
PCT Pub. Date: Oct. 27, 2016

(65) Prior Publication Data
US 2018/0076685 A1    Mar. 15, 2018

(30) Foreign Application Priority Data

Apr. 21, 2015 (JP) ................................. 2015-086847

(51) Int. Cl.
*H02K 41/03* (2006.01)
*H02K 41/02* (2006.01)
(Continued)

(52) U.S. Cl.
CPC ............. *H02K 41/031* (2013.01); *H02K 5/18* (2013.01); *H02K 9/02* (2013.01); *H02K 9/22* (2013.01);
(Continued)

(58) Field of Classification Search
CPC .. H02K 5/18; H02K 9/02; H02K 9/22; H02K 11/0094; H02K 11/30; H02K 11/33; H02K 41/02; H02K 41/03; H02K 41/031
(Continued)

(56) References Cited

U.S. PATENT DOCUMENTS

2003/0234584 A1* 12/2003 Miyata ................. H02K 41/031
310/12.01
2005/0258688 A1* 11/2005 Miyamoto ........... H02K 41/031
310/12.09
(Continued)

FOREIGN PATENT DOCUMENTS

JP          3-66502 U    6/1991
JP          9-312985 A   12/1997
(Continued)

OTHER PUBLICATIONS

Office Action dated Feb. 6, 2018 in Japanese Patent Application No. 2017-514011 (with English translation).
(Continued)

*Primary Examiner* — Jue Zhang
*Assistant Examiner* — David A. Singh
(74) *Attorney, Agent, or Firm* — Xsensus LLP

(57) ABSTRACT

This invention is concerning a linear motor, in which a movable body includes an electricity storage device, a circuit section constituted by an inverter and a control circuit and converting and outputting power supplied from the electricity storage device, and a plurality of armatures, the magnetic fields of which vary in accordance with the power output from the circuit section, and which are arranged so as to be separated from a stator core via a gap. Further, when only the mounted body, the electricity storage device, the circuit section, and the armatures are viewed, the electricity storage device is arranged adjacent to the mounted body.

20 Claims, 15 Drawing Sheets

(51) Int. Cl.
*H02K 5/18* (2006.01)
*H02K 9/02* (2006.01)
*H02K 9/22* (2006.01)
*H02K 11/33* (2016.01)
*H02K 11/00* (2016.01)

(52) U.S. Cl.
CPC ......... *H02K 41/02* (2013.01); *H02K 11/0094* (2013.01); *H02K 11/33* (2016.01)

(58) Field of Classification Search
USPC .............................. 310/12.15, 12.19, 12.31
See application file for complete search history.

(56) References Cited

U.S. PATENT DOCUMENTS

| | | | |
|---|---|---|---|
| 2008/0246349 A1 | 10/2008 | Miyamoto et al. | |
| 2009/0072771 A1* | 3/2009 | McCulley | H02P 9/02 318/150 |
| 2011/0001364 A1* | 1/2011 | Oya | H02K 41/03 310/12.15 |
| 2011/0155485 A1* | 6/2011 | Tsurumi | H01M 10/425 180/65.1 |
| 2015/0004029 A1* | 1/2015 | Utsumi | H05K 13/0413 417/417 |
| 2015/0035388 A1* | 2/2015 | Mita | H02K 41/033 310/12.18 |
| 2015/0061416 A1* | 3/2015 | Kainuma | H02K 9/02 310/12.18 |
| 2015/0244237 A1* | 8/2015 | Takahashi | H02K 41/031 310/12.32 |
| 2016/0268883 A1* | 9/2016 | Kakihara | H02K 41/033 |

FOREIGN PATENT DOCUMENTS

| | | |
|---|---|---|
| JP | 2004-88981 A | 3/2004 |
| JP | 2004-291891 A | 10/2004 |
| JP | 2007-223468 A | 9/2007 |
| JP | 2012-5245 A | 1/2012 |
| JP | 2012-216323 A | 11/2012 |
| JP | 2013-212024 A | 10/2013 |
| JP | 2014-107381 A | 6/2014 |
| WO | WO 2014/057514 A1 | 4/2014 |

OTHER PUBLICATIONS

Office Action dated Sep. 4, 2018 in Japanese Patent Application No. 2017-514011, with English Translation, 8 pages.
International Search Report dated Jun. 14, 2016, in PCT/JP2016/058381 filed Mar. 16, 2016.

* cited by examiner

LINEAR MOTOR

TECHNICAL FIELD

The present invention relates to a linear motor provided with a movable body equipped with an electricity storage device, the movable body being separated from a stator core via a gap and moving along a longitudinal direction of a stator.

BACKGROUND ART

A conventional electric propulsion device is known in which a chargeable/dischargeable electricity storage device, a power converter for converting and outputting power supplied from the electricity storage device, a motor driven by power output from the electric power converter, and a control circuit for controlling operation of the power converter are housed in a casing so as to be integrated with each other (see PTL 1, for example).

In this device, coolant in the casing, air for example, is sent out and circulated by causing a coolant circulation member to rotate, whereby the electricity storage device, the power converter, the motor, and the control circuit housed in the casing are cooled by air cooling.

CITATION LIST

Patent Literature

[PTL 1] Japanese Patent Application Publication No. 2012-005245

SUMMARY OF THE INVENTION

Problem to be Solved by the Invention

However, with this electric propulsion device, it is necessary to bring the electricity storage device close to the motor and the power converter in order to reduce size, however, common electricity storage devices, lithium ion batteries or nickel hydride batteries, for example, have a specified operating temperature of 50° C. or less, hence a problem exists in that, in order to reduce the size of the electric propulsion device, it is necessary to prevent the electricity storage device from reaching high temperatures.

The present invention has been made to solve the problem described above, and an object thereof is to obtain a linear motor in which an electricity storage device is prevented from reaching high temperatures, such that the size of the linear motor can be reduced.

Means for Solving the Problem

The linear motor according to the present invention is a linear motor provided with a stator core, and a movable body which is fixed to a mounted body and moves along the stator core, wherein the movable body includes an electricity storage device, a circuit section constituted by an inverter and a control circuit and converting and outputting power supplied from the electricity storage device, and a plurality of armatures, the magnetic fields of which vary in accordance with power output from the circuit section, and which are arranged so as to be separated from the stator core via a gap, and when only the mounted body, the electricity storage device, the circuit section, and the armatures are viewed, the electricity storage device is arranged adjacent to the mounted body.

Effects of the Invention

With the linear motor according to the present invention, an electricity storage device having a low heat resistance temperature is arranged adjacent to a mounted body, such that the electricity storage device can be prevented from reaching high temperatures and the size of the linear motor can be reduced.

DESCRIPTION OF EMBODIMENTS

Figure 1:
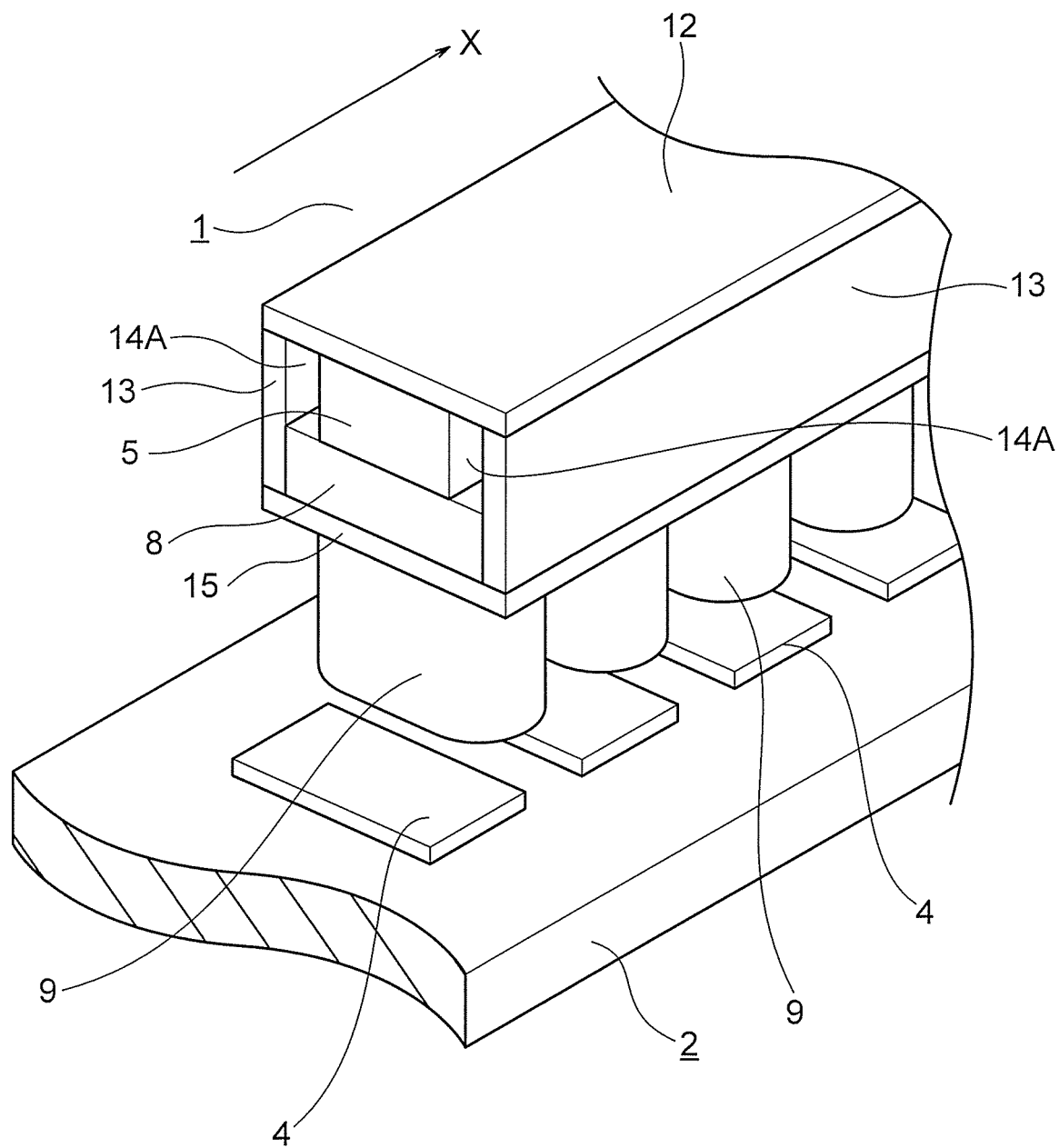
FIG. 1 is a partial perspective view showing a linear motor according to a first embodiment of the present invention.

Linear motors according to each embodiment of the present invention will be described hereinafter with reference to the drawings. In the drawings, identical or corresponding members and parts will be denoted by identical reference numerals.

First Embodiment

Figure 2:
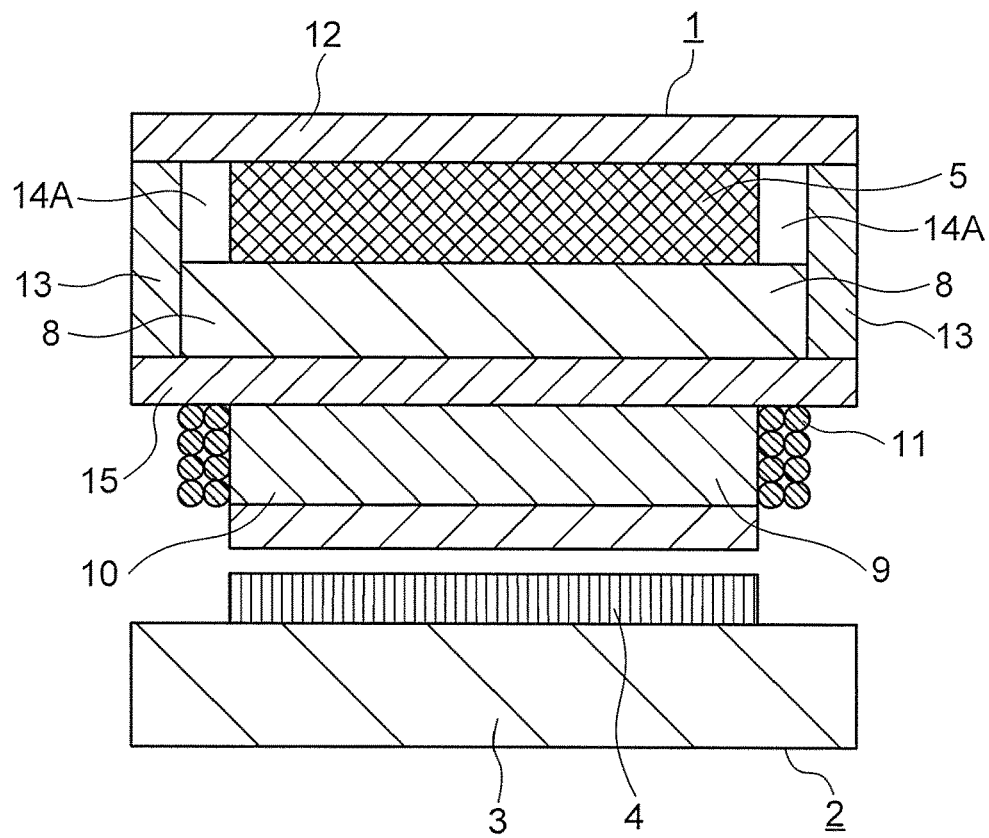
FIG. 2 is a front cross-sectional view showing the linear motor in FIG. 1.
Figure 3:
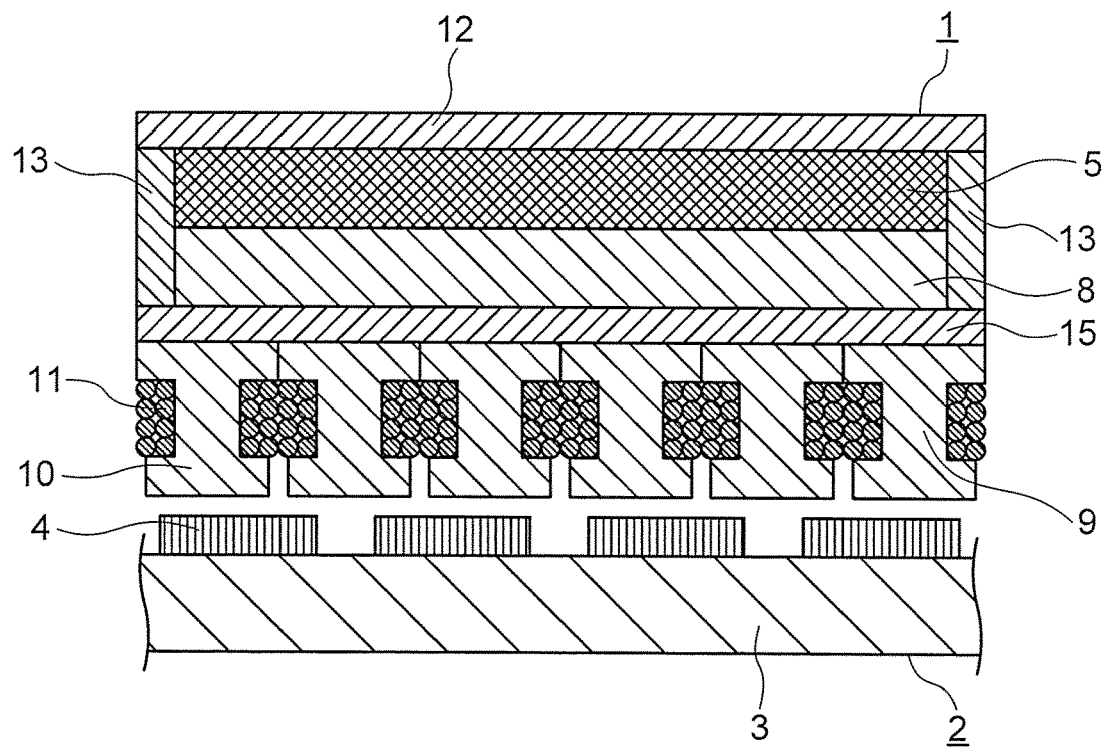
FIG. 3 is a side cross-sectional view showing the linear motor in FIG. 1.
Figure 4:
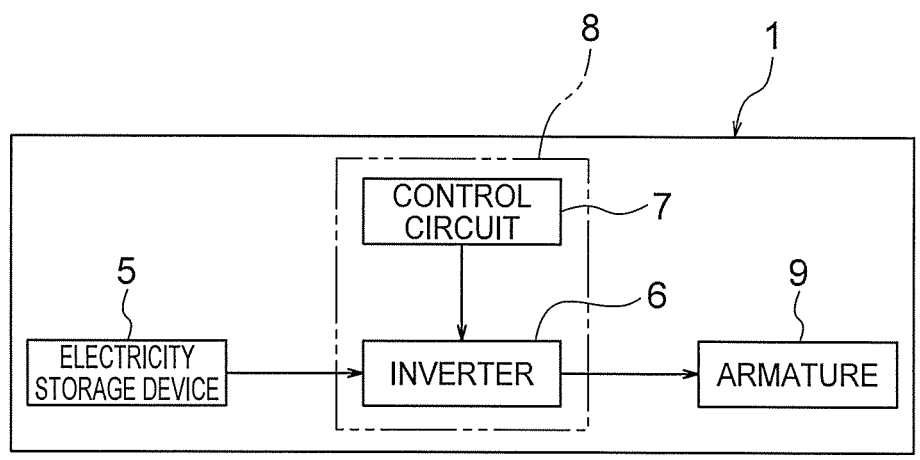
FIG. 4 is a block diagram showing a movable body of FIG. 1.

FIG. 1 is a partial perspective view showing a linear motor, FIG. 2 is a front cross-sectional view showing a cross section perpendicular to an X direction of a movable body 1 shown in FIG. 1 which moves in the X direction, FIG. 3 is a side cross-sectional view showing a vertical cross section taken along the X direction of the movable body 1 shown in FIG. 1, and FIG. 4 is a block diagram showing the movable body 1.

The linear motor is provided with a stator 2 and the movable body 1 which floats above the stator 2.

The stator 2 includes a stator core 3 which extends in a linear manner and a plurality of stator magnets 4 arranged on the stator core 3 along the X direction (FIG. 1) at equal intervals.

The movable body 1 includes a chargeable/dischargeable electricity storage device 5, a circuit section 8 constituted by an inverter 6 and a control circuit 7 for converting and outputting power supplied from the electricity storage device 5, and a plurality of armatures 9, magnetic fields of which vary in accordance with the power output from the circuit section 8, arranged so as to be separated from the stator core 3 via a gap. Further, the movable body 1 moves in the X direction along the stator core 3.

Each of the armatures 9 are provided above each of the stator magnets 4 disposed on a straight line, and are respectively constituted by an armature core 10 and an armature coil 11 wound around the armature core 10.

A mounted body attachment portion 12 is attached to a mounted body. The electricity storage device 5 is fixed to a back face of the mounted body attachment portion 12. The circuit section 8 is fixed to a surface of the electricity storage device 5 on a side opposite to the mounted body attachment portion 12. A pair of frames 13 which oppose each other and extend in a vertical direction are fixed to end surfaces of the circuit section 8 at both sides thereof. Tip surfaces of each of the frames 13 are fixed to the mounted body attachment portion 12. First spaces 14A are formed respectively between the frames 13 and both side surfaces of the electricity storage device 5. The first spaces 14A pass through the movable body 1 in the movement direction thereof.

An armature attachment portion 15 is fixed to a surface of the circuit section 8 on an opposite side to the electricity storage device 5. Each of the armatures 9 are fixed to a lower surface of the armature attachment portion 15. In other words, the armature attachment portion 15 is interposed between the circuit section 8 and the armatures 9.

In the linear motor according to the first embodiment, the electricity storage device 5 having the lowest heat resistance temperature, the circuit section 8 having a higher heat resistance temperature than the electricity storage device 5, and the armatures 9 having a higher heat resistance temperature than the circuit section 8 are arranged in this order from the mounted body attachment portion 12 and are integrated with each other. Through integration in this order, the electricity storage device 5, the circuit section 8 and the armatures 9 can be arranged as close as possible to each other, with the result that the linear motor can be reduced in size. Note that, although it is preferable for the circuit section 8 and the armatures 9 to be arranged adjacent to each other, as the electricity storage device 5 is sufficiently cooled by the mounted body attachment portion 12, the circuit section 8 and the armatures 9 do not necessarily have to be arranged adjacent to each other.

Figure 5:
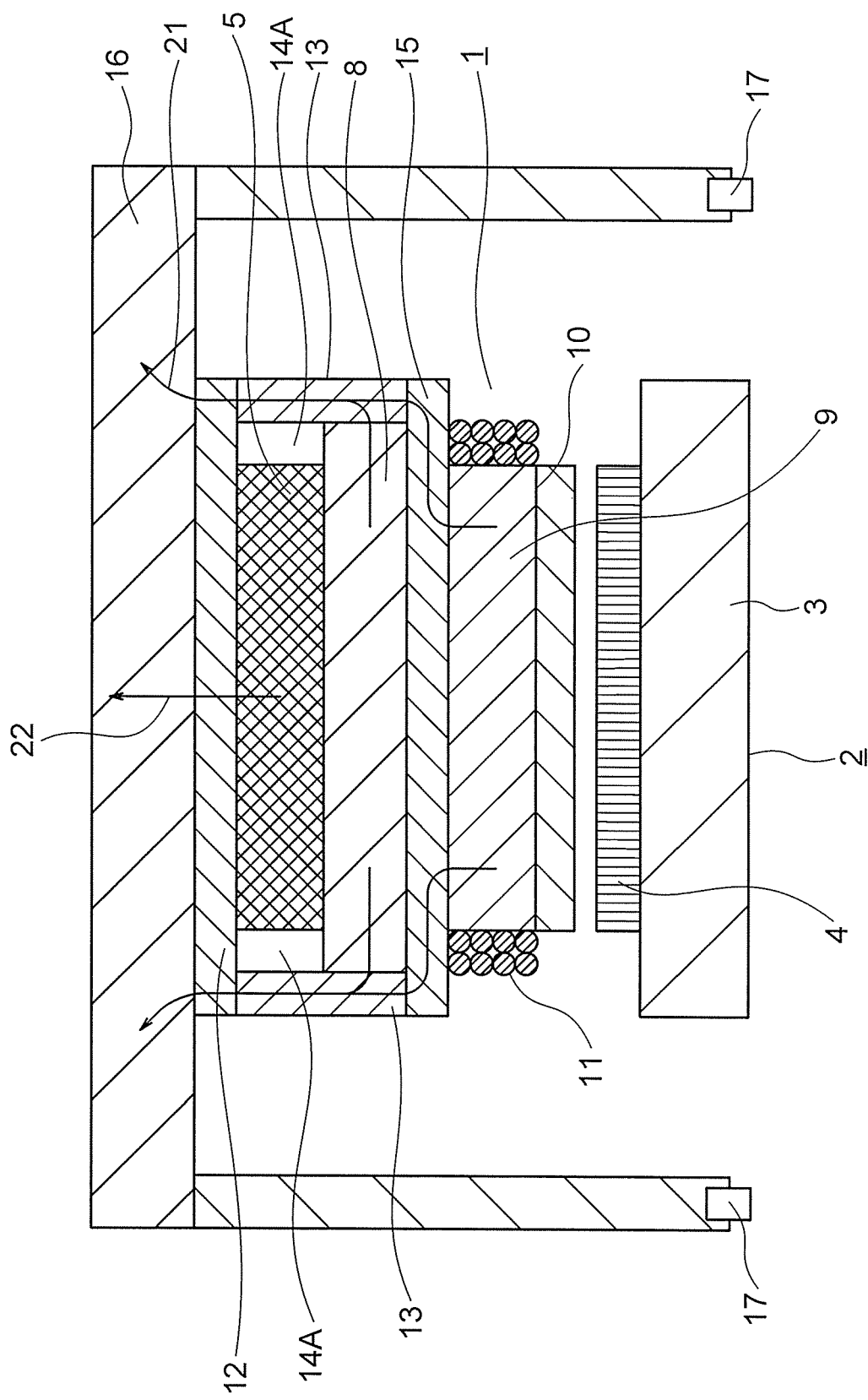
FIG. 5 is a front cross-sectional view of the movable body in FIG. 1 when attached to a conveyance machine.

FIG. 5 is a cross-sectional view of when the movable body 1 shown in FIG. 2 is attached to a lower surface of a conveyance machine 16, that is, the mounted body.

Freely rotatable rotation support portions 17 are attached to lower side end portions of the conveyance machine 16 which has a U-shaped cross section.

When viewing only the conveyance machine 16, the electricity storage device 5, the circuit section 8 and the armatures 9, the electricity storage device 5 is arranged adjacent to the conveyance machine 16, and the armatures 9 are arranged adjacent to the circuit section 8. Further, the electricity storage device 5 is arranged adjacent to the circuit section 8.

The frames 13 are provided between the armature attachment portion 15 and the conveyance machine 16, and at both sides of the armature attachment portion 15 as viewed along the movement direction of the movable body 1.

Heat from the armatures 9 and the circuit section 8 is mainly transmitted to the conveyance machine 16 through the frames 13 as indicated by arrows 21. Heat is also transmitted to the conveyance machine 16 through the electricity storage device 5 as indicated by an arrow 22.

As the mounted body attachment portion 12 above the heat transfer path is formed from aluminium or the like having a high thermal conductivity and functions as a so-called heat sink, a rise in temperature of the electricity storage device 5, the circuit section 8 and the armatures 9 is suppressed.

Moreover, as the first spaces 14A, through which air flows in accordance with the movement of the movable body 1, are provided at both sides of the electricity storage device 5, the electricity storage device 5 and the circuit section 8 are cooled by flowing air, and conduction of heat from the frames 13 to the electricity storage device 5 is suppressed.

In addition, when a heat tolerance temperature of the conveyance machine 16 is low, a heat insulating body may be provided between the mounted body attachment portion 12 and the conveyance machine 16.

Second Embodiment

Figure 6:
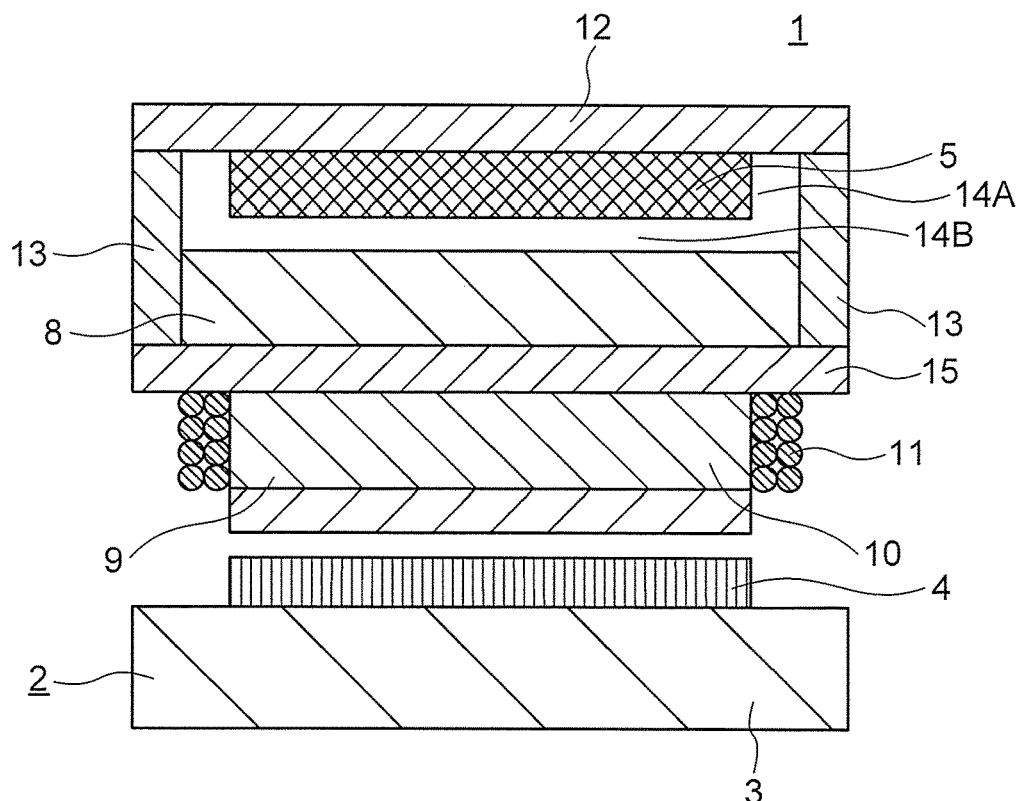
FIG. 6 is a front cross-sectional view showing a linear motor according to a second embodiment of the present invention.

FIG. 6 is a front cross-sectional view showing a linear motor according to a second embodiment of the present invention.

In this embodiment, a second space 14B communicating with the first spaces 14A is formed between the electricity storage device 5 and the frames 13.

Other configurations are the same as those of the linear motor of the first embodiment.

In the linear motor of this embodiment, transfer of heat from the circuit section 8 to the electricity storage device 5 is further suppressed in comparison to the linear motor of the first embodiment due to formation of the second space 14B, such that a rise in temperature of the electricity storage device 5 is further suppressed. This effect is particularly significant when a difference in the tolerance temperatures of the circuit section 8 and the electricity storage device 5 is large.

Third Embodiment

Figure 7:
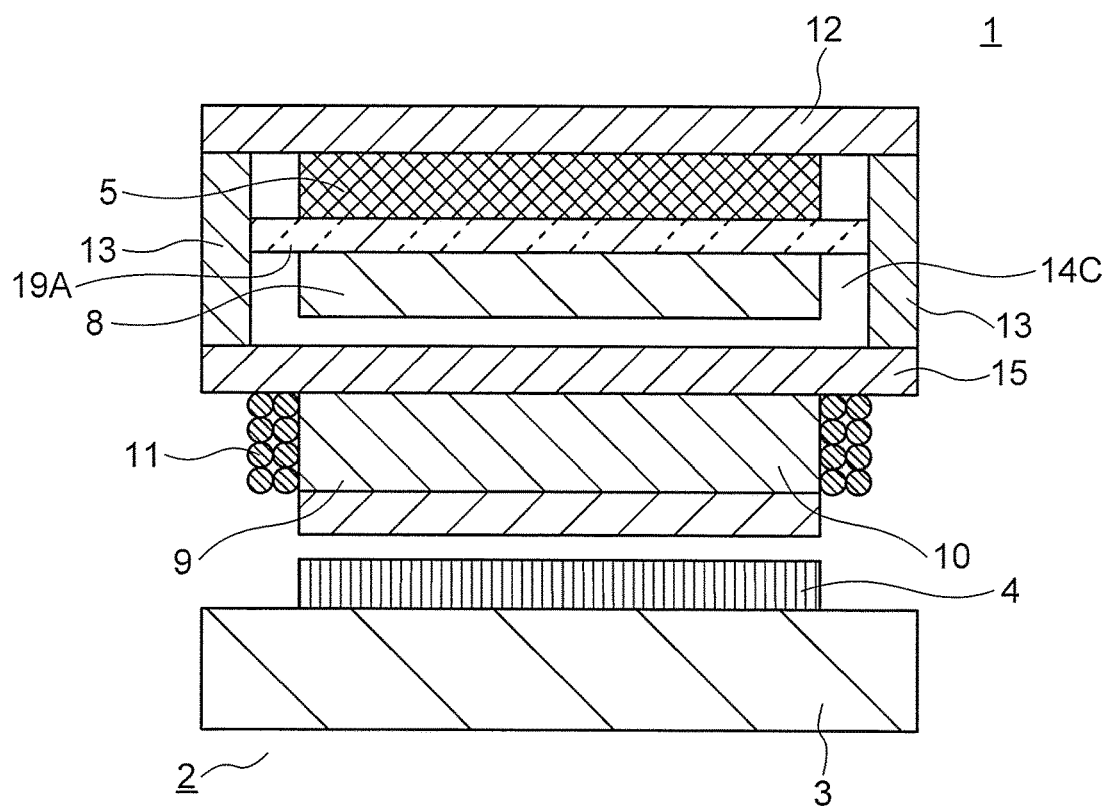
FIG. 7 is a front cross-sectional view showing a linear motor according to a third embodiment of the present invention.

FIG. 7 is a front cross-sectional view showing a linear motor according to a third embodiment of the present invention.

In this embodiment, a first heat insulating body 19A is provided between the electricity storage device 5 and the circuit section 8. Both end portions of the first heat insulating body 19A are respectively connected to the frames 13. The circuit section 8 is supported by the first heat insulating body 19A. The first heat insulating body 19A extends across the entire region of the movable body 1 in the movement direction thereof.

A third space 14C is formed between the electricity storage device 5 and the circuit section 8 and the mounted body attachment portion 12, the frames 13, and the armature attachment portion 15 that surround the electricity storage device 5 and the circuit section 8.

Other configurations are the same as those of the linear motor of the first embodiment.

In this embodiment, the first heat insulating body 19A is interposed between the circuit section 8 and the electricity storage device 5 instead of an air layer, whereby transfer of heat from the circuit section 8 to the electricity storage device 5 is further suppressed in comparison to the linear motor of the second embodiment.

Further, the third space 14C also expands between the circuit section 8 and the armature attachment portion 15, transfer of heat from the armatures 9 to the circuit section 8 is suppressed, and a rise in temperature of the circuit section 8 is further suppressed. This effect is particularly significant when a difference in the tolerance temperatures of the armatures 9 and the circuit section 8 is large.

Fourth Embodiment

Figure 8:
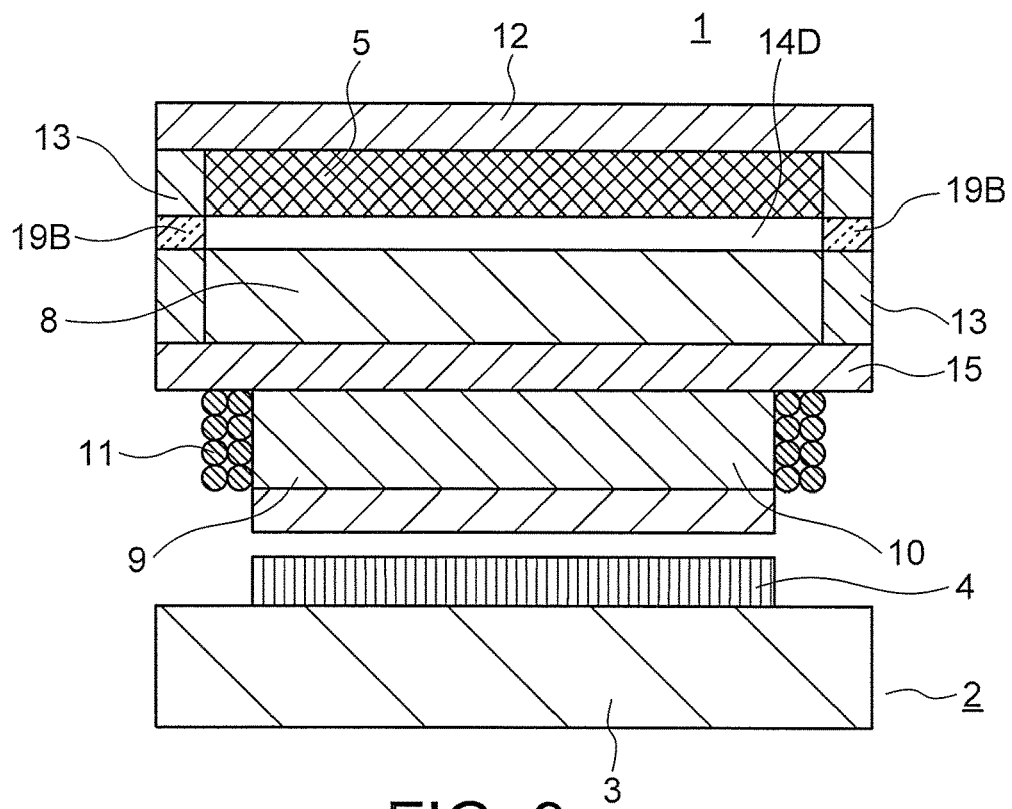
FIG. 8 is a front cross-sectional view showing a linear motor according to a fourth embodiment of the present invention.

FIG. 8 is a front cross-sectional view showing a linear motor according to a fourth embodiment of the present invention.

In this embodiment, a fourth space 14D is formed between the electricity storage device 5 and the circuit section 8. Second heat insulating bodies 19B are provided, so as to span the entire region of the movable body 1 in the movement direction thereof, in areas of each of the frames 13 that oppose both sides of the fourth space 14D respectively. The second heat insulating bodies 19B are provided in areas of the frames 13 between the electricity storage device 5 and the circuit section 8.

Further, both end faces of the electricity storage device 5 are connected to the frames 13.

Other configurations are the same as those of the linear motor of the first embodiment.

In this embodiment, transfer of heat from the circuit section 8 to the electricity storage device 5 is suppressed due to the formation of the fourth space 14D between the electricity storage device 5 and the circuit section 8, such that a rise in temperature of the electricity storage device 5 is suppressed.

Further, as the second heat insulating bodies 19B are provided in an intermediate section of each of the frames 13, transfer of heat from the armatures 9 and the circuit section 8 through the frames 13 to the electricity storage device 5 and the mounted body attachment portion 12 is suppressed, such that a rise in temperature of the electricity storage device 5 and the mounted body attachment portion 12 is suppressed. This effect is particularly significant when the tolerance temperature of the conveyance machine 16 is low and transfer of heat to the conveyance machine 16 is to be restricted.

Note that, as barely any heat from the armatures 9 and the circuit section 8 is transferred to the electricity storage device 5 via the frames 13, an air layer does not have to be provided between the electricity storage device 5 and the frames 13 as in the first embodiment.

Fifth Embodiment

Figure 9:
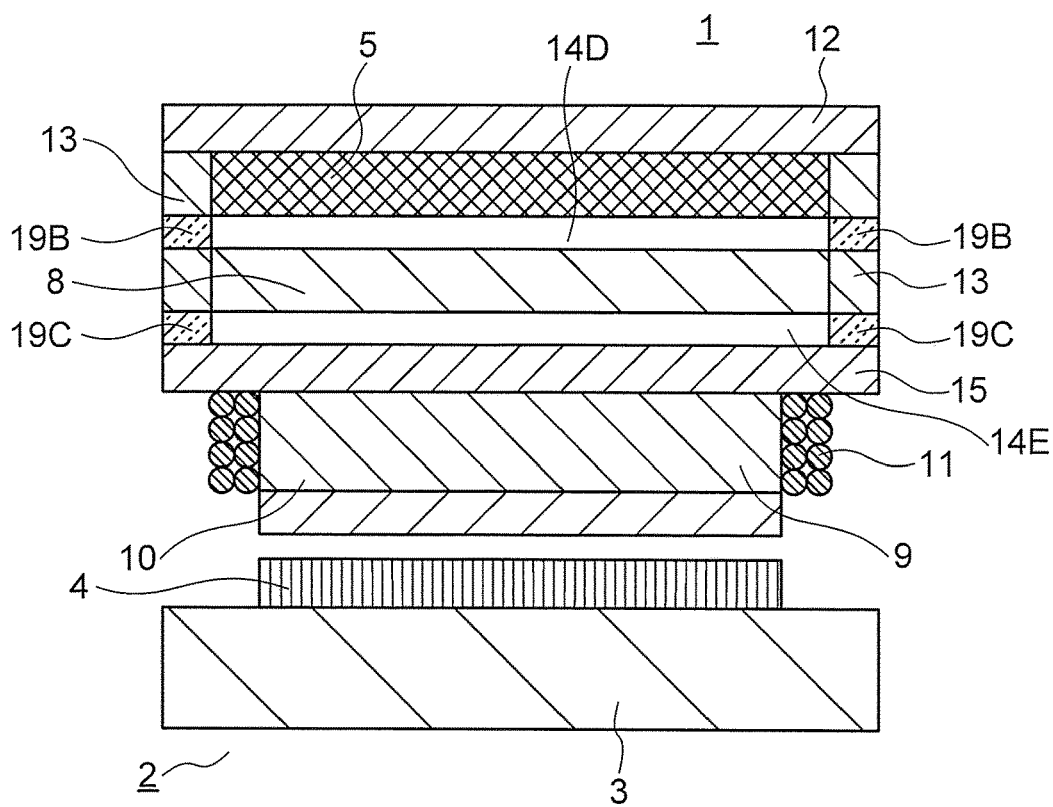
FIG. 9 is a front cross-sectional view showing a linear motor according to a fifth embodiment of the present invention.

FIG. 9 is a front cross-sectional view showing a linear motor according to a fifth embodiment of the present invention.

In this embodiment, the fourth space 14D is formed between the electricity storage device 5 and the circuit section 8. The second heat insulating bodies 19B are provided, so as to span the entire region of the movable body 1 in the movement direction thereof, in areas of each of the frames 13 that oppose both sides of the fourth space 14D respectively.

Further, a fifth space 14E is formed between the circuit section 8 and the armature attachment portion 15. Third heat insulating bodies 19C, which oppose both sides of the fifth space 14E respectively, are provided so as to span the entire region of the movable body 1 in the movement direction thereof, between the lower end faces of each of the frames 13 and an upper face of the armature attachment portion 15 at both sides thereof. The third heat insulating bodies 19C are provided in areas of the frames 13 between the circuit section 8 and the armature attachment portion 15.

Both end faces of the electricity storage device 5 are connected to the frames 13.

Other configurations are the same as those of the linear motor of the first embodiment.

In the linear motor of this embodiment, the fifth space 14E is formed between the circuit section 8 and the armature attachment portion 15 in addition to the fourth space 14D and the second heat insulating bodies 19B of the linear motor of the fourth embodiment, such that transfer of heat from the armatures 9 to the circuit section 8 via the armature attachment portion 15 is suppressed and a rise in temperature of the circuit section 8 is suppressed.

Further, as the third heat insulating bodies 19C are provided between the lower end faces of each of the frames 13 and the upper face of the armature attachment portion 15 at both sides thereof, transfer of heat from the armatures 9 through the frames 13 to the circuit section 8, the electricity storage device 5, and the mounted body attachment portion 12 is prevented and a rise in temperature of the circuit section 8, the electricity storage device 5 and the mounted body attachment portion 12 is suppressed. This effect is particularly significant when the tolerance temperature of the conveyance machine 16 is low and transfer of heat to the conveyance machine 16 is to be restricted.

Sixth Embodiment

Figure 10:
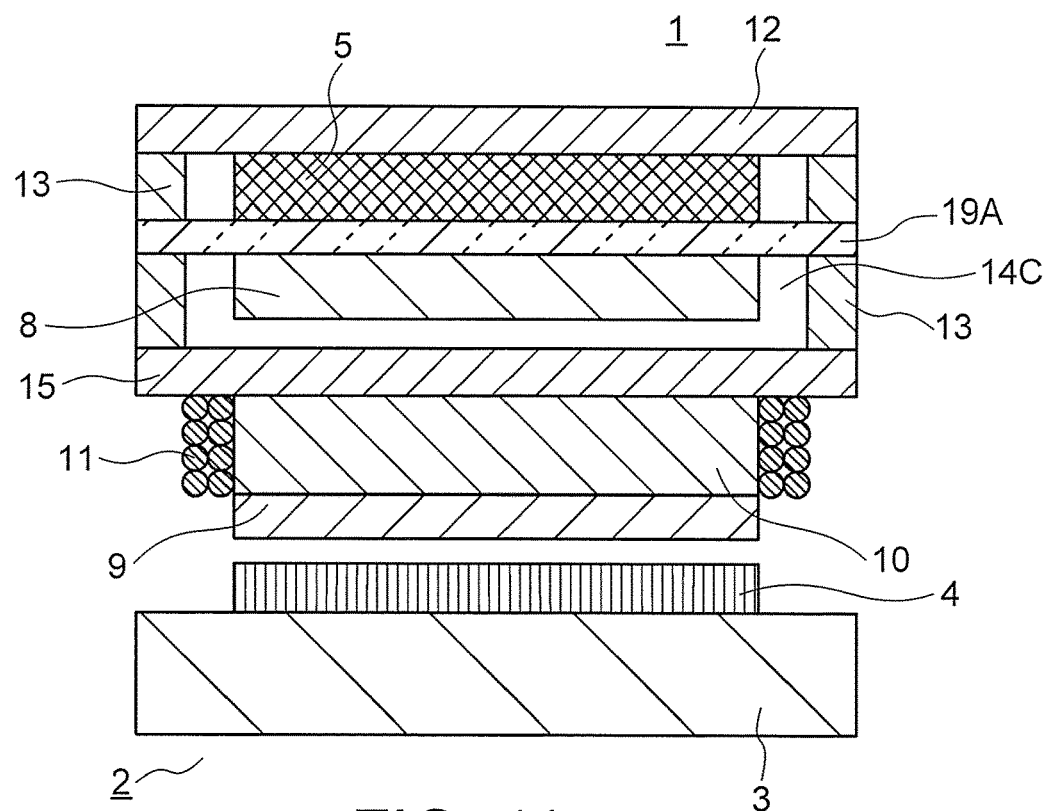
FIG. 10 is a front cross-sectional view showing a linear motor according to a sixth embodiment of the present invention.

FIG. 10 is a front cross-sectional view showing a linear motor according to a sixth embodiment of the present invention.

In this embodiment, both end portions of the first heat insulating body 19A respectively penetrate and divide the frames 13.

Other configurations are the same as those of the linear motor of the third embodiment.

In this embodiment, the frames 13 are divided by both end portions of the first heat insulating body 19A and, in addition to the effect obtained by the linear motor of the third embodiment shown in FIG. 7, heat transfer from the armatures 9 through the armatures through the frames 13 to the electricity storage device 5 and the mounted body attachment portion 12 is further suppressed and a rise in temperature of the electricity storage device 5 and the mounted body attachment portion 12 is suppressed.

Moreover, the first heat insulating body 19A may have a flat plate shape, such that material processing costs can be reduced.

Seventh Embodiment

Figure 11:
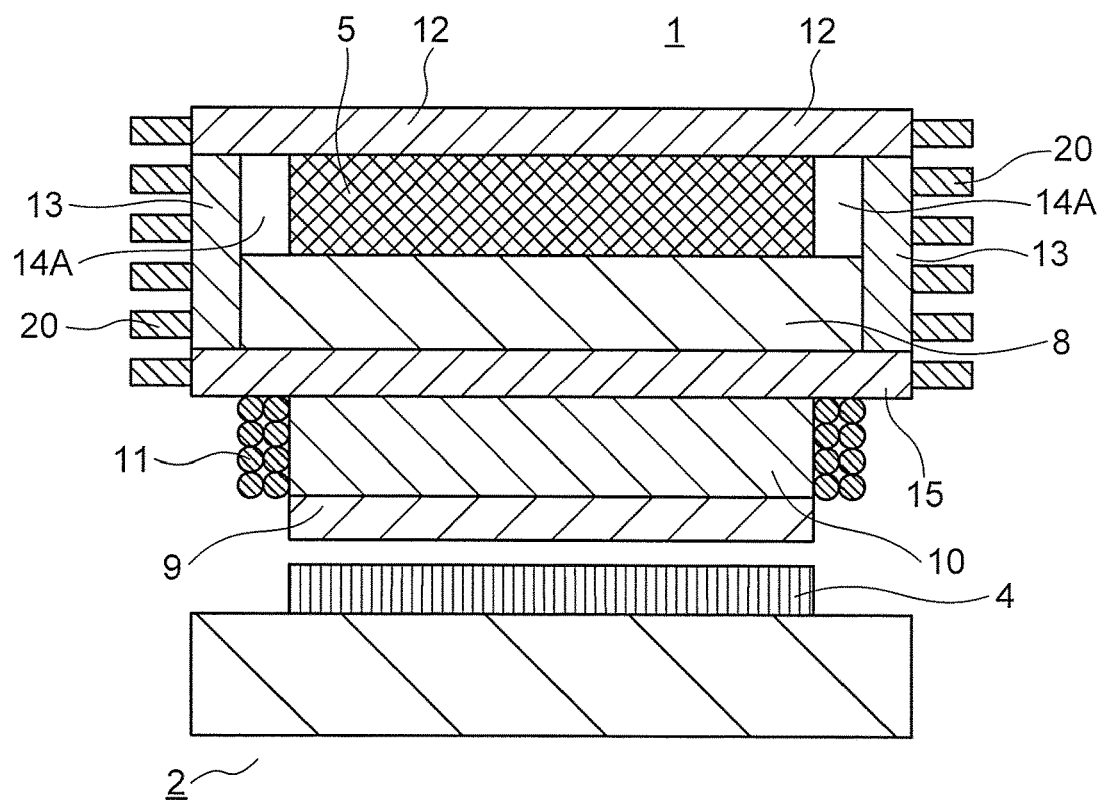
FIG. 11 is a front cross-sectional view showing a linear motor according to a seventh embodiment of the present invention.

FIG. 11 is a front cross-sectional view showing a linear motor according to a seventh embodiment of the present invention.

In this embodiment, a plurality of fins 20 extending along the movement direction of the movable body 1 are respectively provided on the mounted body attachment portion 12, the frames 13 and the armature attachment portion 15 at both sides of the movable body 1.

Other configurations are the same as those of the linear motor of the first embodiment.

In this embodiment, heat dissipation of the movable body 1 is improved due to provision of the fins 20.

Eighth Embodiment

Figure 12:
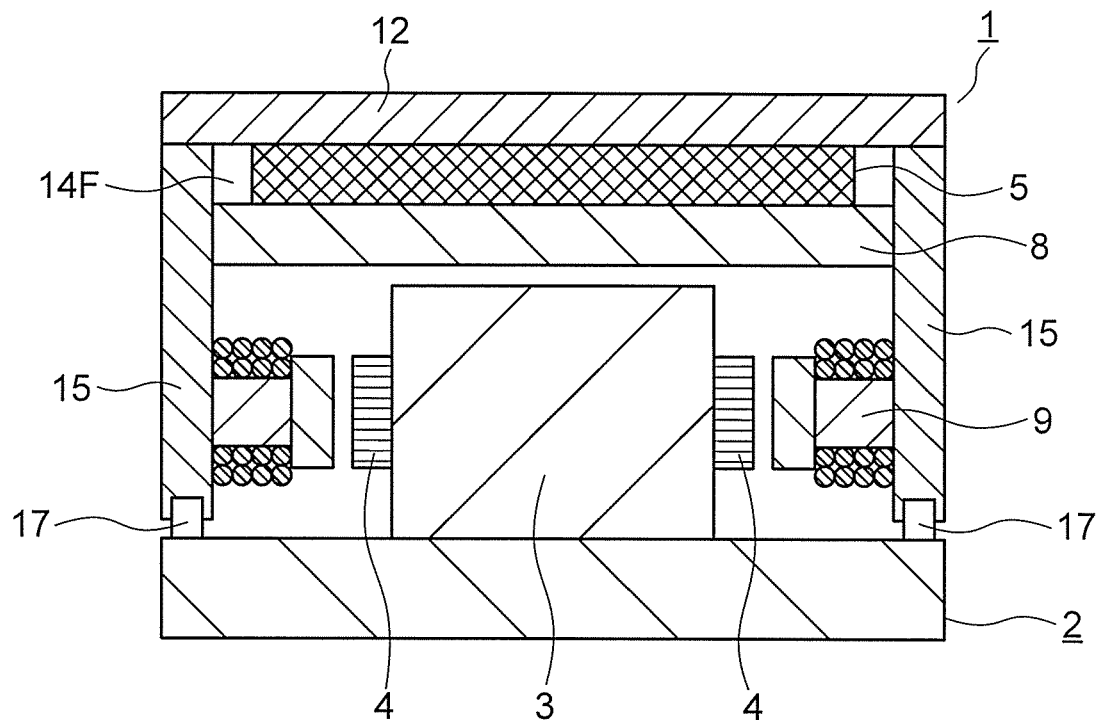
FIG. 12 is a front cross-sectional view showing a linear motor according to an eighth embodiment of the present invention.

FIG. 12 is a front cross-sectional view showing a linear motor according to an eighth embodiment of the present invention.

In this embodiment, a pair of armature attachment portions 15 which extend in the vertical direction are provided at end portions of the mounted body attachment portion 12 at both sides thereof. The armatures 9 are attached to each of the armature attachment portions 15. The freely rotatable rotation support portions 17 are attached to the tip portions of each of the armature attachment portions 15. A stator core 3 is disposed between the mutually opposing armatures 9. The stator magnets 4 are respectively fixed to side surfaces of the stator core 3 which oppose the armatures 9.

The electricity storage device 5 is fixed to the lower surface of the mounted body attachment portion 12. The circuit section 8, end surfaces at both sides thereof being fixed to the armature attachment portions 15, is in contact with the lower surface of the electricity storage device 5. A pair of sixth spaces 14F are formed between the electricity storage device 5 and the armature attachment portions 15.

In this embodiment, the electricity storage device 5 having the lowest heat resistance temperature, the circuit section 8 having a higher heat resistance temperature than the electricity storage device 5, and the armatures 9 having a higher heat resistance temperature than the circuit section 8 are arranged in this order from the mounted body attachment portion 12 and, as a result of the electricity storage device 5, the circuit section 8, and the circuit section 8 being arranged as close as possible to each other, the linear motor can be reduced in size.

In addition, the sixth spaces 14F are formed at both sides of the electricity storage device 5 and, due to the cooling and insulation that results from the flow of air in the sixth spaces 14F, a rise in temperature of the electricity storage device 5 can be suppressed.

Further, the stator 2 is disposed between the opposing armatures 9 and, by employing a configuration in which a magnetic force of attraction is nullified, the load placed on the rotation support portions 17 of the movable body 1 is reduced and thrust density is improved.

Ninth Embodiment

Figure 13:
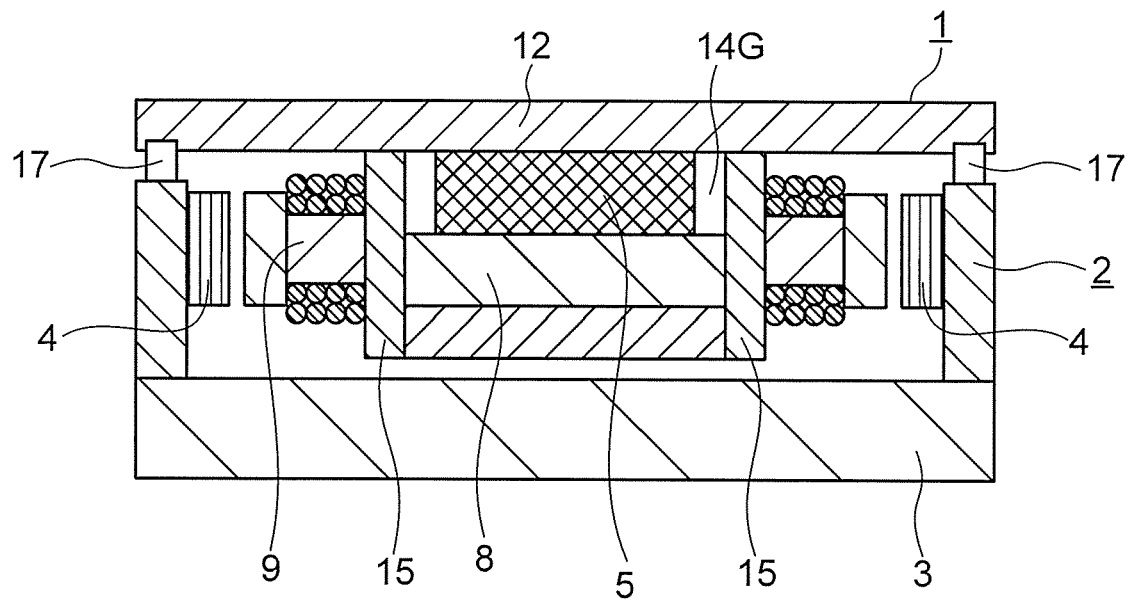
FIG. 13 is a front cross-sectional view showing a linear motor according to a ninth embodiment of the present invention.

FIG. 13 is a front cross-sectional view showing a linear motor according to a ninth embodiment of the present invention.

In this embodiment, the stator magnets 4 are respectively provided on a pair of sections of the stator core 3 that stand so as to oppose each other. In other words, the stator magnets 4 are fixed to each of the standing sections of the stator core 3. The freely rotatable rotation support portions 17 are provided at both end portions of the mounted body attachment portion 12. The pair of mutually opposing armature attachment portions 15 are fixed to the mounted body attachment portion 12. The armatures 9 are fixed to the respective armature attachment portions 15 so as to face the stator magnets 4.

The electricity storage device 5 is fixed to the mounted body attachment portion 12. The circuit section 8 is in contact with the lower surface of the electricity storage device 5. Both sides of the circuit section 8 are fixed to the armature attachment portions 15.

In addition, seventh spaces 14G are respectively formed at both sides of the electricity storage device 5 and, due to the cooling and insulation that results from the flow of air in the seventh spaces 14G, a rise in temperature of the electricity storage device 5 can be suppressed.

In this embodiment, the electricity storage device 5 having the lowest heat resistance temperature and the circuit section 8 having a higher heat resistance temperature than the electricity storage device 5 are arranged in this order from the mounted body attachment portion 12, the armatures 9 having a higher heat resistance temperature than the circuit section 8 are arranged at both sides of the circuit section 8 and, as a result of the electricity storage device 5, the circuit section 8, and the circuit section 8 being arranged as close as possible to each other, the linear motor can be reduced in size.

In addition, the seventh spaces 14G are formed at both sides of the electricity storage device 5 and, due to the cooling and insulation that results from the flow of air in the seventh spaces 14G, a rise in temperature of the electricity storage device 5 can be suppressed.

Tenth Embodiment

Figure 14:
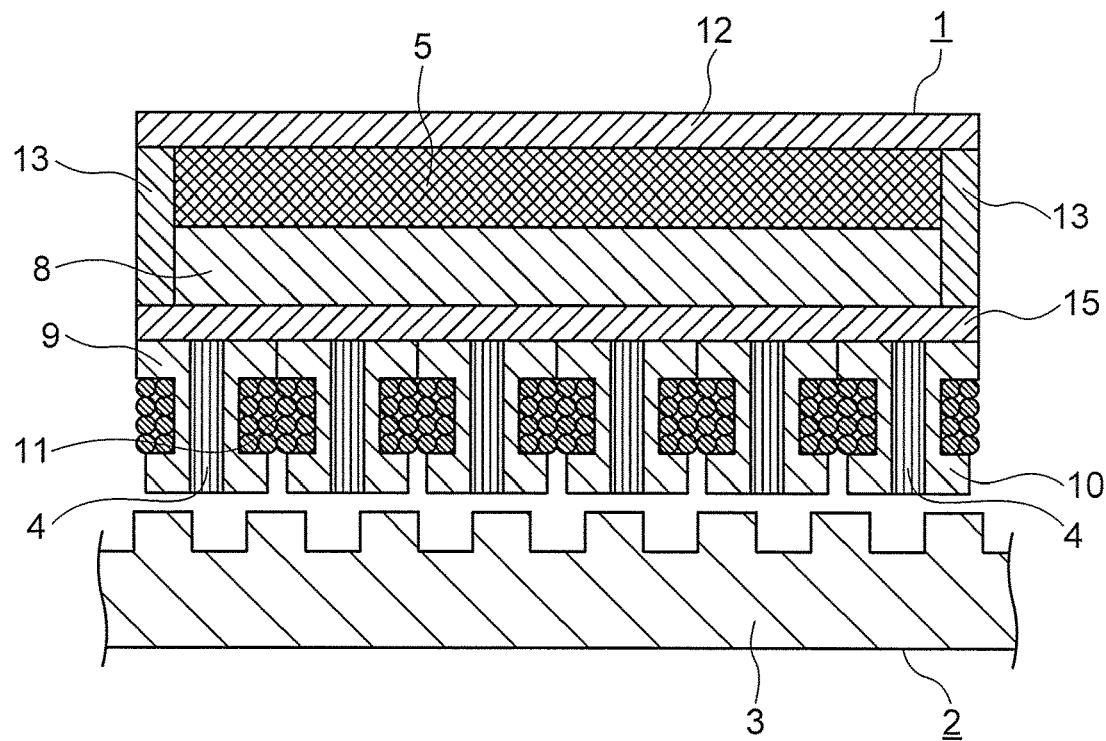
FIG. 14 is a side cross-sectional view showing a linear motor according to a tenth embodiment of the present invention.

FIG. 14 is a side cross-sectional view showing a linear motor according to a tenth embodiment of the present invention.

In this embodiment, the stator core 3 is embedded in the armature cores 10, and the surface of the stator core 3, which opposes the armatures 9, has a continuously uneven shape.

Other configurations are the same as those of the linear motor of the first embodiment.

With the linear motor of this embodiment, size can be reduced in the same way as with the linear motor of the first embodiment and, as the stator magnets 4 are provided on the movable body 1 side, when the motor stroke is a long distance, the number of the stator magnets 4 to be used can be significantly reduced in comparison to the linear motors of the first to ninth embodiments, allowing cost to be reduced.

Eleventh Embodiment

Figure 15:
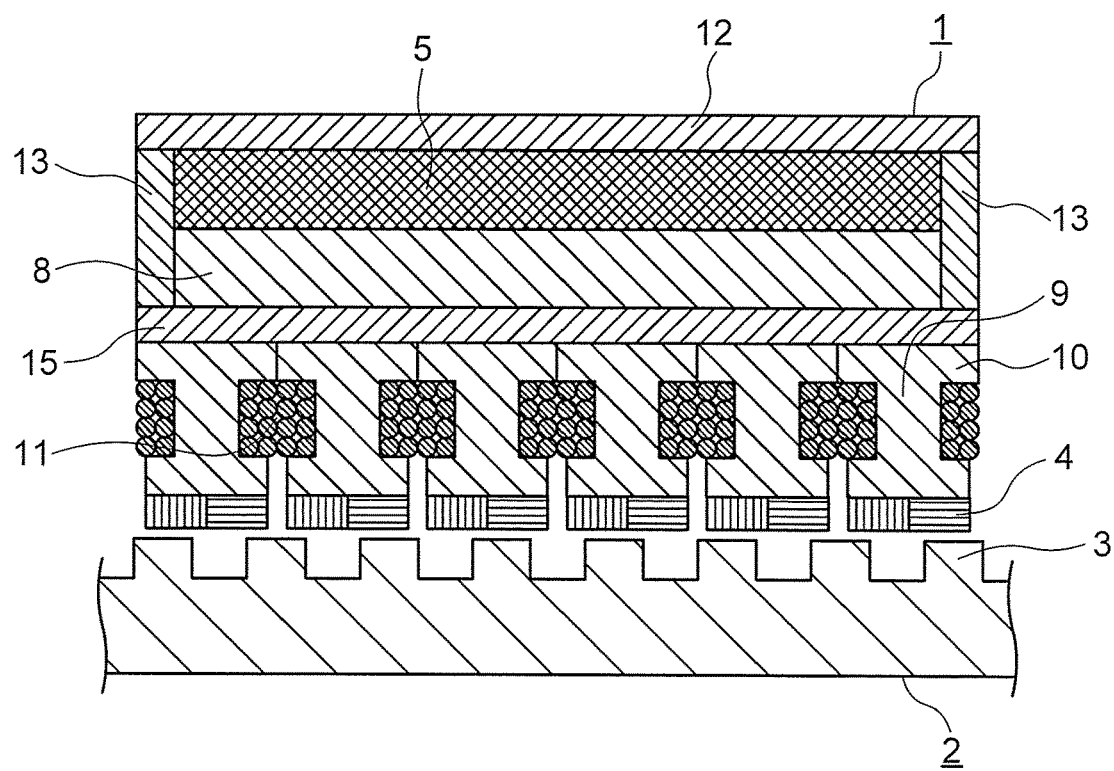
FIG. 15 is a side cross-sectional view showing a linear motor according to an eleventh embodiment of the present invention.

FIG. 15 is a side cross-sectional view showing a linear motor according to an eleventh embodiment of the present invention.

In this embodiment, the stator core 3 is fixed to lower surfaces of the armature cores 10, and the surface of the stator core 3, which opposes the armatures 9, has a continuously uneven shape.

Other configurations are the same as those of the linear motor of the first embodiment.

With the linear motor of this embodiment, size can be reduced in the same way as with the linear motor of the first embodiment and, as the stator magnets 4 are provided on the movable body 1 side, when the motor stroke is a long distance, the number of the stator magnets 4 to be used can be significantly reduced in comparison to the linear motors of the first to ninth embodiments, allowing cost to be reduced.

Twelfth Embodiment

Figure 16:
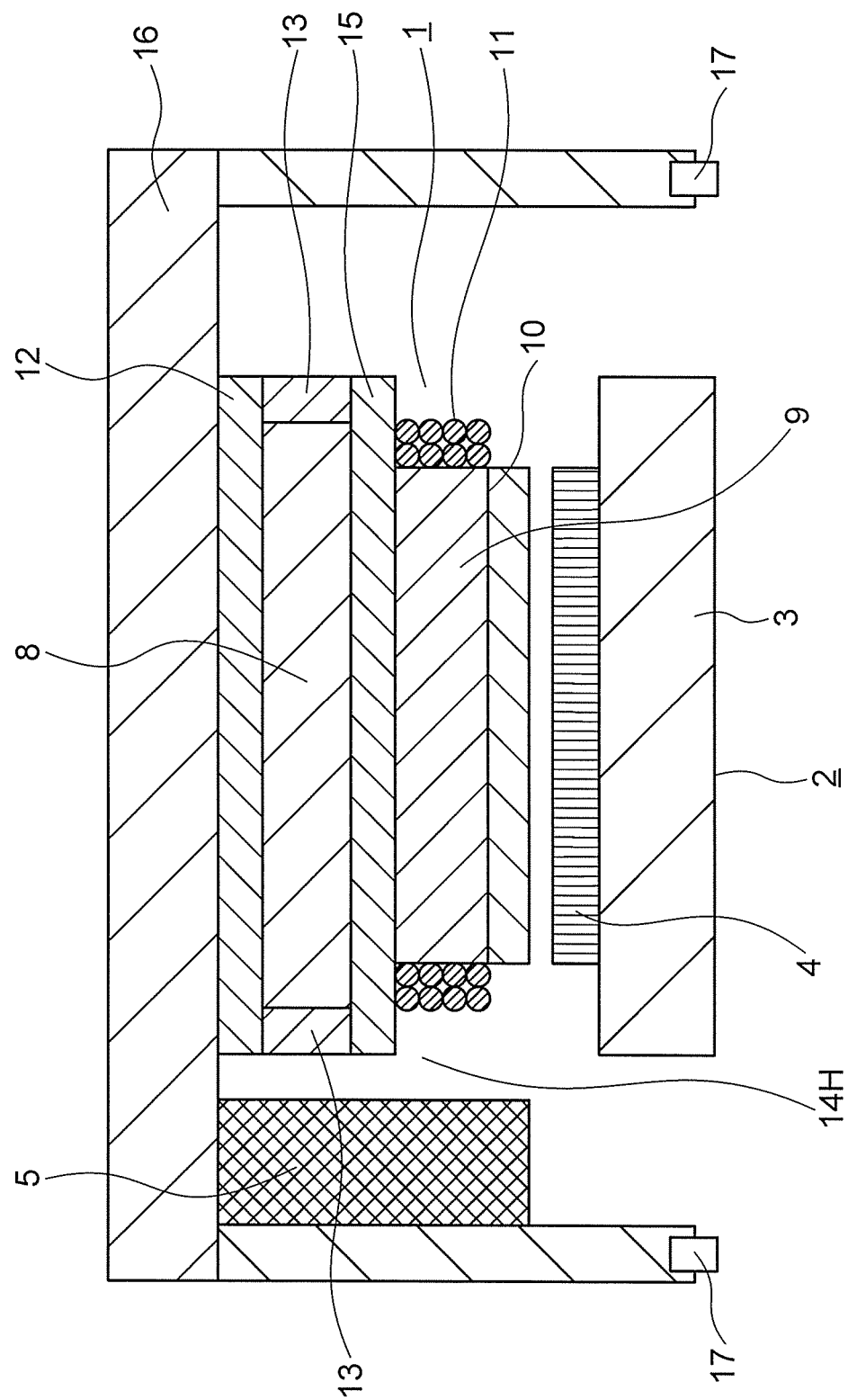
FIG. 16 is a front cross-sectional view showing a linear motor according to a twelfth embodiment of the present invention.

FIG. 16 is a front cross-sectional view showing a linear motor according to a twelfth embodiment of the present invention.

In this embodiment, the electricity storage device 5 is attached to one side—an inner side surface—of the conveyance machine 16.

Other configurations are the same as those of the linear motor of the first embodiment.

In the linear motor of this embodiment, an eighth space 14H exists between the electricity storage device 5 and the circuit section 8 and the armatures 9, such that a rise in temperature of the electricity storage device 5 can suppressed due to the inflow and the insulation of air. Moreover, as the electricity storage device 5 is disposed on a side surface of the conveyance machine 16, the size of the movable body 1 in the vertical direction can be reduced. Further, as the electricity storage device 5 and the armatures 9 are separated from each other via a gap and the electricity storage device 5 is not directly subjected to the influence of the excitation force of the armatures 9, the vibration resistance of the electricity storage device 5 is improved.

Thirteenth Embodiment

Figure 17:
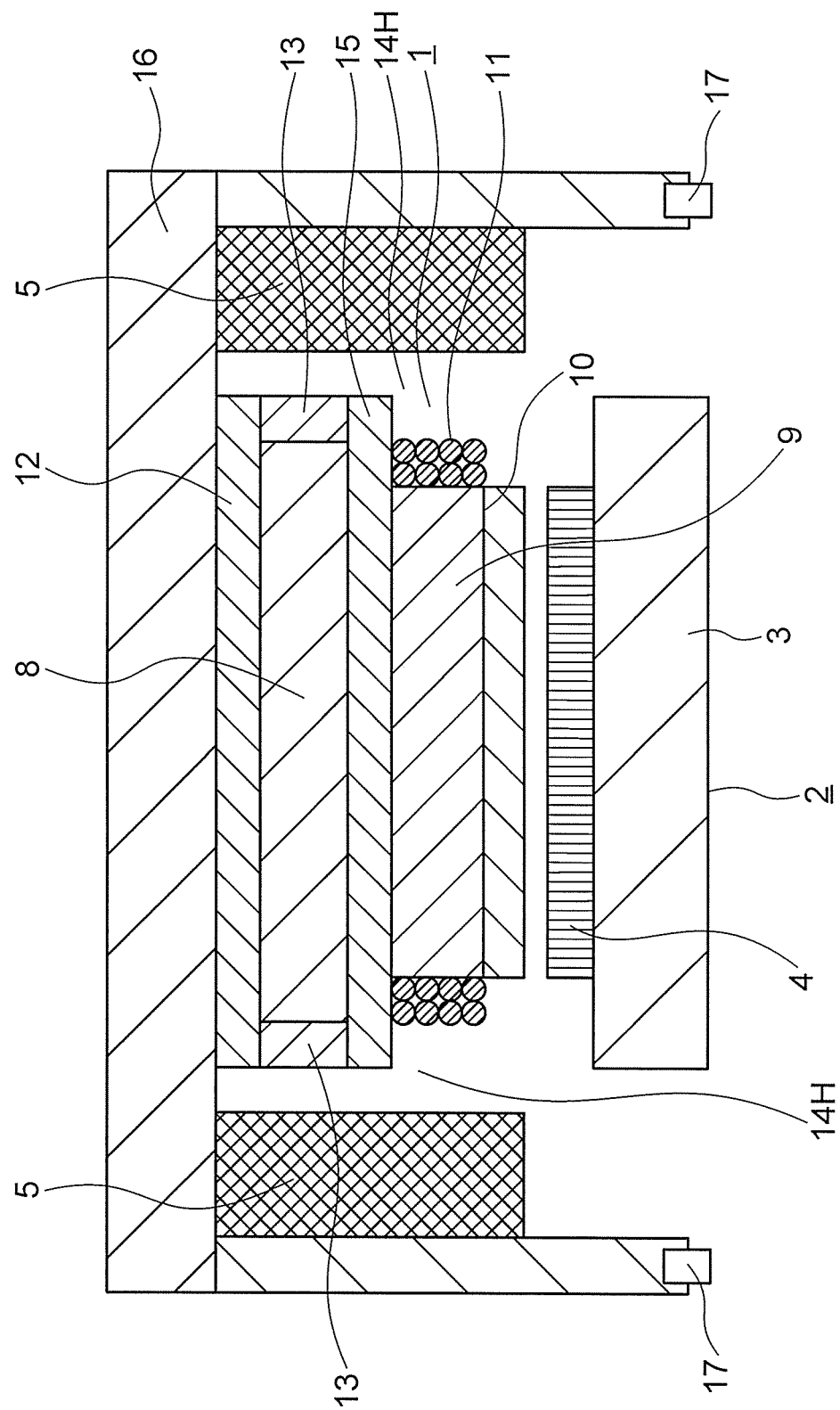
FIG. 17 is a front cross-sectional view showing a linear motor according to a thirteenth embodiment of the present invention.

FIG. 17 is a front cross-sectional view showing a linear motor according to a thirteenth embodiment of the present invention.

In this embodiment, the electricity storage device 5 is attached to the inner side surfaces of the conveyance machine 16 on both sides thereof respectively.

Other configurations are the same as those of the linear motor of the twelfth embodiment.

In the linear motor of this embodiment, the electricity storage device 5, which is generally heavy, is arranged on both sides of the movable body 1, such that the center of gravity of the movable body 1 is transferred to a linear guide central point. For this reason, in addition to realising the same effect as the twelfth embodiment, bias of weight to the left or right of FIG. 17 can be suppressed and an effect can be achieved in which wear of the linear guide can be avoided.

Fourteenth Embodiment

Figure 18:
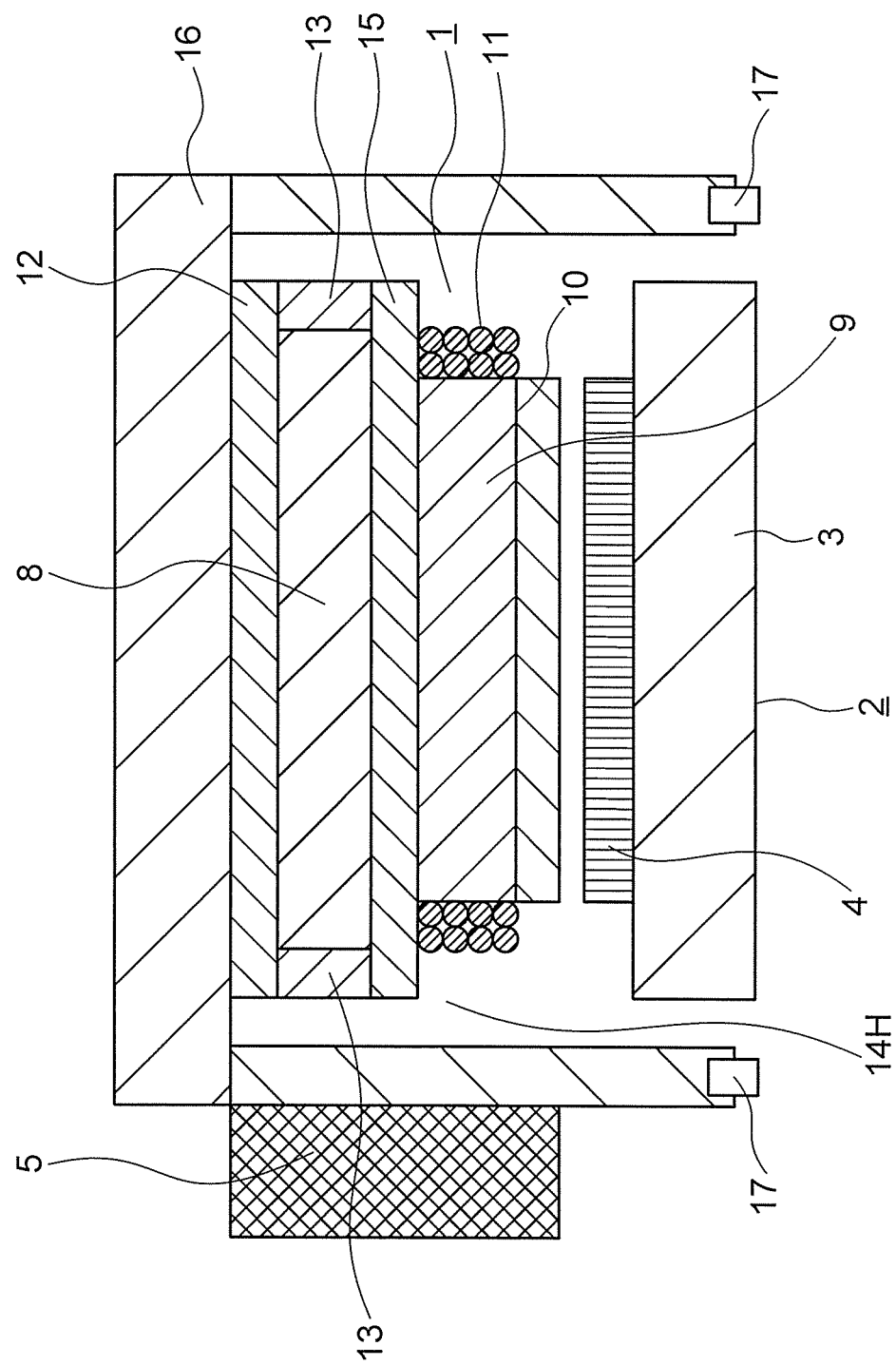
FIG. 18 is a front cross-sectional view showing a linear motor according to a fourteenth embodiment of the present invention.

FIG. 18 is a front cross-sectional view showing a linear motor according to a fourteenth embodiment of the present invention.

In this embodiment, the electricity storage device 5 is attached to one side—an outer side surface—of the conveyance machine 16.

Other configurations are the same as those of the linear motor of the twelfth embodiment.

In the linear motor of this embodiment, the electricity storage device 5 is arranged on an outer side surface of the conveyance machine 16 such that, in addition to realising the same effect as the twelfth embodiment, an effect can be obtained in which the electricity storage device 5 can be easily replaced.

Fifteenth Embodiment

Figure 19:
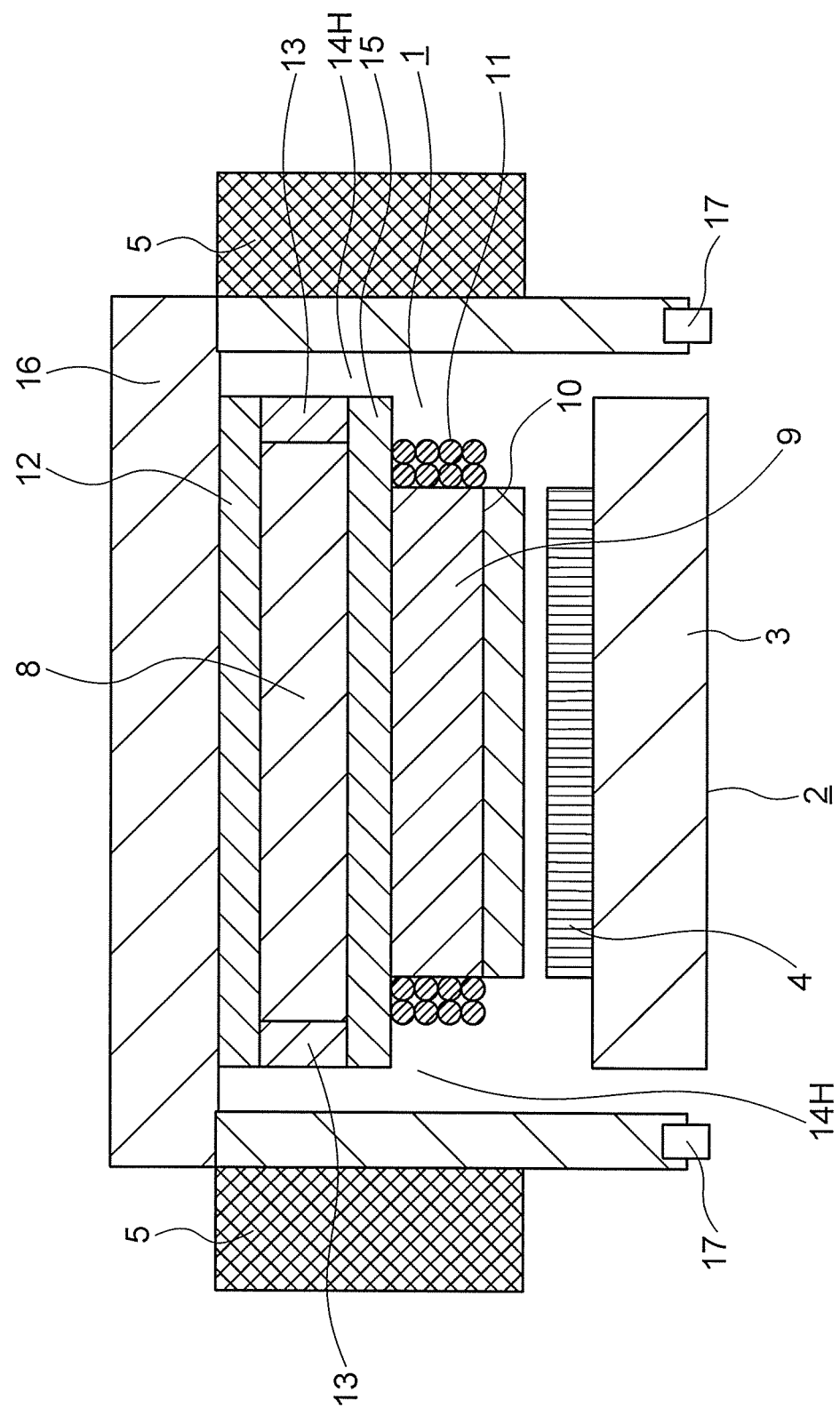
FIG. 19 is a front cross-sectional view showing a linear motor according to a fifteenth embodiment of the present invention.

FIG. 19 is a front cross-sectional view showing a linear motor according to a fifteenth embodiment of the present invention.

In this embodiment, the electricity storage device 5 is attached to the outer side surfaces of the conveyance machine 16 on both sides thereof respectively.

Other configurations are the same as those of the linear motor of the thirteenth embodiment.

In the linear motor of this embodiment, the electricity storage device 5 is arranged on the outer side surfaces of the conveyance machine 16 such that, in addition to realising the same effect as the thirteenth embodiment, an effect can be obtained in which the electricity storage device 5 can be easily replaced.

Sixteenth Embodiment

Figure 20:
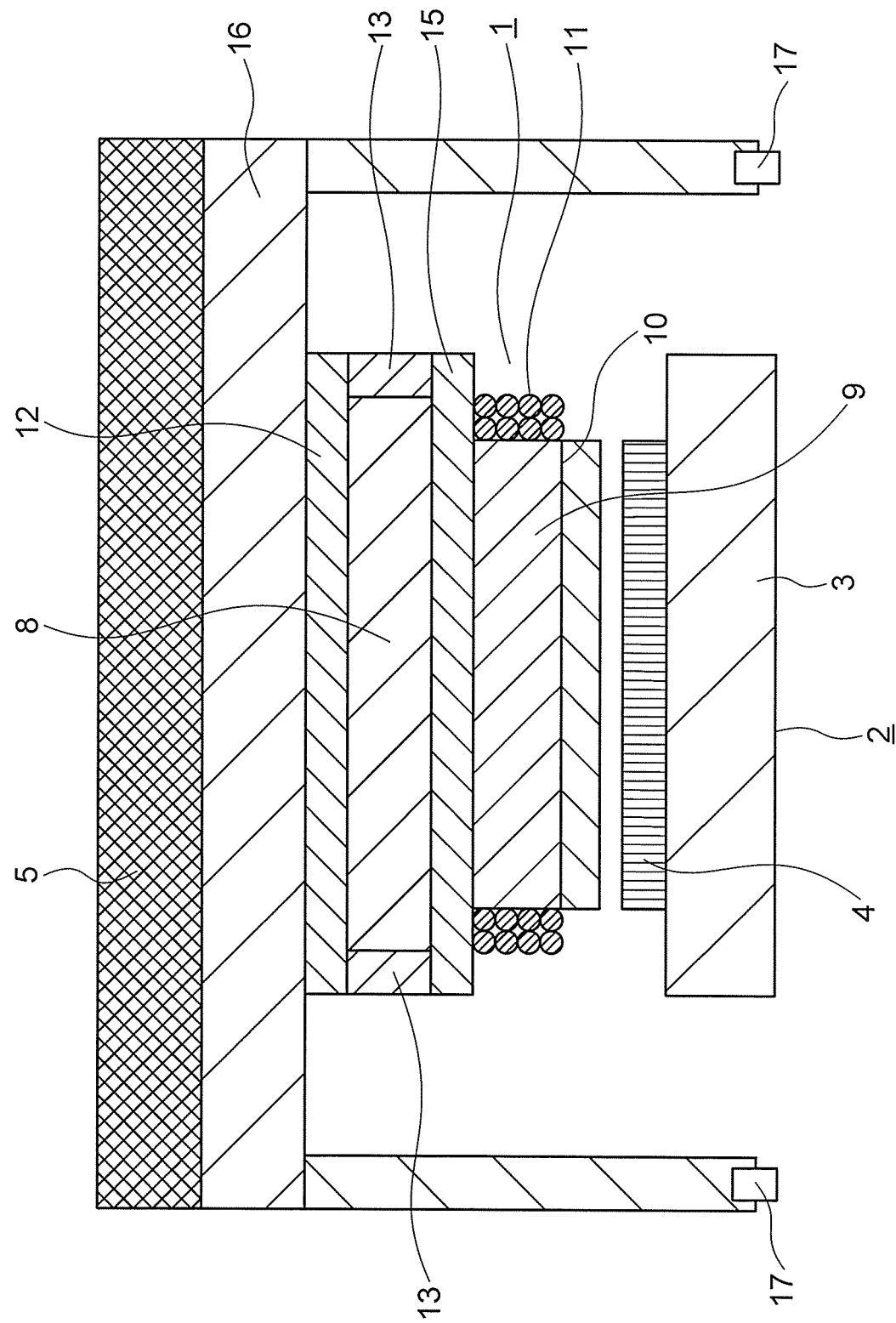
FIG. 20 is a front cross-sectional view showing a linear motor according to a sixteenth embodiment of the present invention.

FIG. 20 is a front cross-sectional view showing a linear motor according to a sixteenth embodiment of the present invention.

In this embodiment, the electricity storage device 5 is attached to an upper surface of the conveyance machine 16.

Other configurations are the same as those of the linear motor of the twelfth embodiment.

With the linear motor of this embodiment, the size of the movable body 1 in the lateral direction can be reduced in comparison to the twelfth embodiment, and the electricity storage device can be easily replaced.

Seventeenth Embodiment

Figure 21:
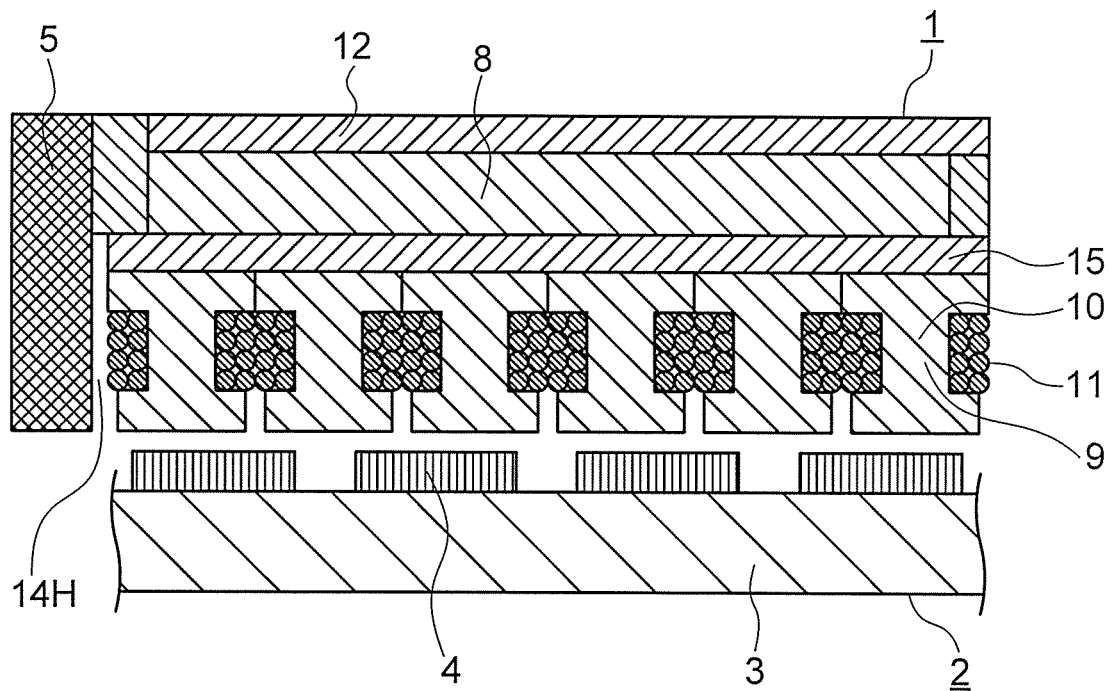
FIG. 21 is a side cross-sectional view showing a linear motor according to a seventeenth embodiment of the present invention.

FIG. 21 is a side cross-sectional view showing a linear motor according to a seventeenth embodiment of the present invention.

In this embodiment, the electricity storage device 5 is attached to a vertical surface of one end portion of the movable body 1 in a direction parallel to the traveling direction of the conveyance machine 16.

Other configurations are the same as those of the linear motor of the first embodiment.

In the linear motor of this embodiment, the eighth space 14H exists between the electricity storage device 5 and the circuit section 8 and the armatures 9, such that a rise in temperature of the electricity storage device can be suppressed due to insulation. Moreover, as the movable body 1 moves with the electricity storage device 5 at the head thereof, more air that has not been heated by the electricity storage device 5 is blown onto the electricity storage device 5 than in a case in which the electricity storage device 5 is disposed on a side surface of the movable body 1, and a rise in temperature of the electricity storage device 5 can be further suppressed. In addition, as the electricity storage device 5 is disposed on an outer surface of the movable body 1, the size of the movable body 1 in the vertical direction and the horizontal direction can be reduced, and the electricity storage device 5 can be easily replaced. Further, as the electricity storage device 5 and the armatures 9 are separated from each other via a gap and the electricity storage device 5 is not directly subjected to the influence of the excitation force of the armatures 9, the vibration resistance of the electricity storage device 5 is improved.

Eighteenth Embodiment

Figure 22:
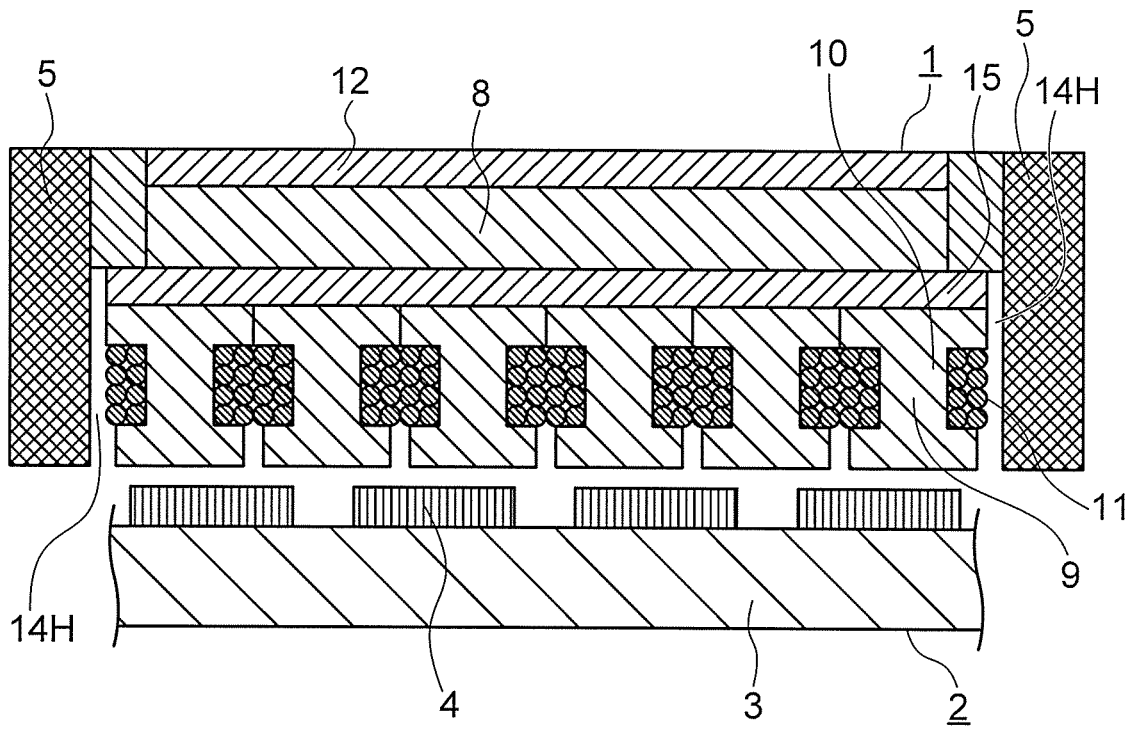
FIG. 22 is a side cross-sectional view showing a linear motor according to an eighteenth embodiment of the present invention.

FIG. 22 is a side cross-sectional view showing a linear motor according to an eighteenth embodiment of the present invention.

In this embodiment, the electricity storage device 5 is attached to vertical surfaces of both end portions of the movable body 1 in a direction parallel to the traveling direction of the conveyance machine 16.

Other configurations are the same as those of the linear motor of the seventeenth embodiment.

With this embodiment, in addition to realizing the same effect as the seventeenth embodiment, an effect can be obtained in which the electricity storage device 5 can be effectively cooled when the conveyance machine 16 moves in either direction.

Note that, in each of the embodiments described above, the spaces 14A to 14H are respectively filled with air interposed therein and, in accordance with the movement of the movable body 1, air, which has an insulating effect, passes (flows) through the movable body 1, and the electricity storage device 5 and the circuit section 8 are cooled, however, transfer of heat to the electricity storage device 5 and the circuit section 8 may also be prevented by filling the spaces 14A to 14H with an insulating material.

Further, at such a time, openings at both sides of the spaces 14A to 14H may be sealed by a cover.

Moreover, the fins 20 of the seventh embodiment may also be provided on the movable body 1 according to any of the other embodiments.

In addition, the mounted body is not limited to the conveyance machine 16.

REFERENCE SIGNS LIST

1 Movable body
2 Stator
3 Stator core
4 Stator magnets
5 Electricity storage device
6 Inverter
7 Control circuit
8 Circuit section
9 Armature
10 Armature core
11 Armature coil
12 Mounted body attachment portion
13 Frame
14A First space
14B Second space
14C Third space
14D Fourth space
14E Fifth space
14F Sixth space
14G Seventh space
14H Eighth space
15 Armature attachment portion
16 Conveyance machine (mounted body)
17 Rotation support portion
19A First heat insulating body
19B Second heat insulating body
19C Third heat insulating body
20 Fin

The invention claimed is:

1. A linear motor comprising:
    a stator core; and
    a movable body which is fixed to a mounted body and moves along the stator core, wherein the movable body includes:
        an electricity storage device;
        a circuit section constituted by an inverter and a control circuit and converting and outputting power supplied from the electricity storage device; and
        a plurality of armatures, the magnetic fields of which vary in accordance with power output from the circuit section, and which are arranged so as to be separated from the stator core via a gap, and
        in a cross-section of the linear motor, the electricity storage device is arranged adjacent to the mounted body.

2. The linear motor according to claim 1, wherein, in the cross-section, the armatures are arranged adjacent to the circuit section.

3. The linear motor according to claim 1, wherein, in the cross-section, the electricity storage device is arranged adjacent to the circuit section.

4. The linear motor according to claim 3, wherein the movable body further includes:
    an armature attachment portion interposed between the circuit section and the armatures; and
    a pair of frames disposed between the armature attachment portion and the mounted body and provided at both sides of the armature attachment portion, and
    a space is formed between the frames and the electricity storage device.

5. The linear motor according to claim 4, wherein fins extending in the movement direction of the movable body are provided on the frames.

6. The linear motor according to claim 4, wherein the space is filled with air that flows therethrough in accordance with movement of the movable body.

7. The linear motor according to claim 4, wherein the space is filled with an insulating material.

8. The linear motor according to claim 1, wherein a space is formed between the electricity storage device and the circuit section.

9. The linear motor according to claim 1, wherein the movable body further includes:

an armature attachment portion interposed between the circuit section and the armatures, a pair of frames disposed between the armature attachment portion and the mounted body and provided at both sides of the armature attachment portion, and a first heat insulating body, both end portions of which are respectively connected to the frames, and interposed between the electricity storage device and circuit section.

10. The linear motor according to claim 9, wherein both end portions of the first heat insulating body respectively penetrate the frames.

11. The linear motor according to claim 9, wherein a space is formed between (1) the electricity storage device and the circuit section, and (2) the mounted body, the frames, and the armature attachment portion that surround the electricity storage device and the circuit section.

12. The linear motor according to claim 1, wherein the movable body further includes:

an armature attachment portion interposed between the circuit section and the armatures, a pair of frames disposed between the armature attachment portion and the mounted body and provided at both sides of the armature attachment portion, and second heat insulating bodies provided in areas of the frames between the electricity storage device and the circuit section.

13. The linear motor according to claim 12, wherein a space is formed between the electricity storage device and the circuit section.

14. The linear motor according to claim 1, wherein the movable body further includes:

an armature attachment portion interposed between the circuit section and the armatures;

a pair of frames disposed between the armature attachment portion and the mounted body and provided at both sides of the armature attachment portion, and third heat insulating bodies provided in areas of the frames between the circuit section and the armature attachment portion.

15. The linear motor according to claim 14, wherein a space is formed between the circuit section and the mounted body.

16. The linear motor according to claim 1, wherein the movable body further includes a mounted body attachment portion to be attached to the mounted body, and the electricity storage device is attached to the mounted body attachment portion.

17. The linear motor according to claim 1, wherein the electricity storage device is attached to a surface of the mounted body.

18. The linear motor according to claim 1, wherein, in the cross-section, the electricity storage device, the circuit section, and the armatures are arranged in this order from the mounted body.

19. The linear motor according to claim 1, wherein, in the cross-section, the electricity storage device having a lowest heat resistance temperature, the circuit section having a higher heat resistance temperature than the electricity storage device, and the armatures having a higher heat resistance temperature than the circuit section are arranged in this order from the mounted body.

20. A linear motor comprising:

a stator core; and a movable body which is fixed to a mounted body and moves along the stator core, wherein the movable body includes:

an electricity storage device;

a circuit section constituted by an inverter and a control circuit and converting and outputting power supplied from the electricity storage device; and a plurality of armatures, the magnetic fields of which vary in accordance with power output from the circuit section, and which are arranged so as to be separated from the stator core via a gap, the electricity storage device, the circuit section, and the armatures are integrated with each other, and the electricity storage device is fixed to the mounted body.

* * * * *